United States Patent [19]

Chemtob et al.

[11] Patent Number: 4,505,884

[45] Date of Patent: * Mar. 19, 1985

[54] PROCESS FOR PRODUCING HF FROM IMPURE PHOSPHORIC ACIDS

[75] Inventors: Elie M. Chemtob, Claremont; Gary L. Beer, Huntington Beach, both of Calif.

[73] Assignee: Occidental Research Corporation, Los Angeles, Calif.

[ * ] Notice: The portion of the term of this patent subsequent to Apr. 12, 2000 has been disclaimed.

[21] Appl. No.: 378,456

[22] Filed: May 17, 1982

[51] Int. Cl.$^3$ .......................... C01B 7/19; C01B 25/16
[52] U.S. Cl. .................................. 423/484; 423/319; 423/320; 423/321 R; 423/483
[58] Field of Search .............. 423/316, 317, 319, 320, 423/321 R, 483, 484

[56] References Cited

U.S. PATENT DOCUMENTS

| | | | |
|---|---|---|---|
| 3,235,330 | 2/1966 | Lapple | 23/165 |
| 3,241,917 | 3/1966 | Lapple | 23/165 |
| 3,379,501 | 4/1968 | Treitler et al. | 423/321 R |
| 3,397,956 | 8/1968 | Buchanan et al. | 23/165 |
| 3,410,656 | 11/1968 | Bunin et al. | 23/165 |
| 3,442,610 | 5/1969 | Mustian, Jr. et al. | 23/165 |
| 3,642,439 | 2/1972 | Moore et al. | 23/165 |
| 3,671,189 | 6/1972 | Betts | 23/88 |
| 3,792,151 | 1/1974 | Case | 423/320 |
| 4,082,836 | 4/1978 | Oré | 423/321 S |
| 4,136,199 | 1/1979 | Mills | 423/321 R |
| 4,233,281 | 11/1980 | Hirko et al. | 423/484 |
| 4,243,637 | 1/1981 | Bradford et al. | 423/10 |
| 4,243,643 | 1/1981 | Mills | 423/321 R |
| 4,284,614 | 8/1981 | Oré | 423/321 S |
| 4,299,804 | 11/1981 | Parks et al. | 423/321 R |
| 4,351,809 | 9/1982 | Meggy et al. | 423/167 |
| 4,351,813 | 9/1982 | Meggy et al. | 423/304 |
| 4,377,560 | 3/1983 | Oré | 423/321 R |
| 4,379,776 | 4/1983 | Beer et al. | 423/321 R |

FOREIGN PATENT DOCUMENTS 467843  6/1937  United Kingdom ............ 423/321 R

OTHER PUBLICATIONS

New Zealand Journal of Science, vol. 19, pp. 421 to 431, (1976), M. S. White.
Russian Journal of Inorganic Chemistry, 25(7), Jul. 1980.
Nuclear Magnetic Resonance & Raman Studies of the Aluminum Complexes formed in Aqueous Solutions of Aluminum Salts Containing Phosphoric Acid & Fluoride Ions, J. Chemical Society (A), 1971, Akitt, Greenwood & Lester.

Primary Examiner—Gregory A. Heller
Attorney, Agent, or Firm—Barry A. Bisson

[57] ABSTRACT

Substantially calcium-free fluoroaluminum phosphate precipitate (which also contains iron) can be produced by the aging of wet process phosphoric acid containing iron, fluorine and aluminum, preferably phosphoric acid analyzing in the range of about 15%–45 weight percent $P_2O_5$, 2–4% $Al_2O_3$ and 1–2% fluorine. One process involves digestion of phosphate ore matrix in recycled phosphoric acid, filtration to remove the insoluble residue, precipitation and filtration to remove gypsum, and aging of the product acid to precipitate the aluminum impurity as a fluoroaluminum phosphate compound. The fluoroaluminum phosphate can be decomposed (as by heating at about 195° C.) to produce HF and aluminum phosphate.

6 Claims, 1 Drawing Figure

PROCESS FOR PRODUCING HF FROM IMPURE PHOSPHORIC ACIDS

CROSS REFERENCES TO RELATED APPLICATIONS

This application is related to commonly owned pending applications Ser. Nos. 282,466 of Oré, now U.S. Pat. No. 4,377,560, issued Mar. 23, 1983 and Ser. No. 282,465 of Chemtob and Beer, now U.S. Pat. No. 4,379,776, issued Apr. 12, 1983. The entire disclosure of both of these applications is hereby incorporated herein.

BACKGROUND OF THE INVENTION

The invention relates to a method for removing aluminum and/or fluorine and/or iron from impure phosphoric acids and involves processes for producing novel, monoclinic, aluminum fluorophosphates (or fluoroaluminum phosphates) of composition $AlFHPO_4.2H_2O$ (or $FAlHPO_4.2H_2O$) which contain iron and are essentially free of calcium, are hygroscopic, are usually layered, and can be readily decomposed (in strong sulfuric acid or by heating) to recover hydrogen fluoride. When decomposed by heating, the aluminum fluorophosphate can produce a solid aluminum phosphate which can be used as a fertilizer, or converted to sodium phosphates, etc.

The present invention also involves a means of removing aluminum and fluorine from impure phosphoric acids and means of converting high alumina content phosphate matrix into a relatively low aluminum content phosphoric acid without the usual beneficiation by flotation. This process permits conversion to phosphoric acid (and aluminum phosphate) of a much greater proportion of the phosphate values in the matrix. For example, in the usual beneficiation of phosphate matrix, by the dihydrate or hemihydrate routes, only about fifty percent of the phosphate values in the matrix are recovered in the beneficiated product. In contrast, about eighty percent of the phosphate values in the matrix can be recovered by the present process.

Phosphate reserves are sedimentary deposits formed by reprecipitation of dissolved phosphate from prehistoric seas. For example, a typical North Florida phosphate ore consists primarily of fluorapatite (a phosphate-containing mineral), quartz sand, and clay minerals. This ore body is called the phosphate matrix.

In current mining practice, the matrix is excavated by draglines, slurried with water at high pressure (e.g. about 200 pounds per square inch) and pumped through miles of pipeline to the beneficiation plants where sand and clays are removed from the fluorapatite by flotation processes, producing the so-called beneficiated phosphate rock.

Current commercial processes call for the usage of either beneficiated or high quality phosphate rock and sulfuric acid as raw materials to produce either hemihydrate or dihydrate phosphoric acid. In most cases where beneficiation operations are required, losses of about 40% $P_2O_5$ values in the matrix occur in the form of slimes and tailings. The slimes are discharged to storage ponds as a dilute slurry containing about 5% of fine particulate minerals, which take years to settle. For every acre-ft of matrix mined, about 1.5 acre-ft of slime is produced as a result of beneficiation. Accordingly, rock beneficiation creates an environmental concern in addition to the large loss of $P_2O_5$ values.

In U.S. Pat. No. 3,792,151 to Case, phosphoric acid is produced from low BPL (bone phosphate of lime or tricalcium phosphate) phosphate rock having about 1.5% fluorine by a process comprising reacting the phosphate rock with an equilibrated phosphoric acid (as defined in the Case Patent) having a $P_2O_5$ concentration between about 20 to 50% in an attack stage at a temperature below about 180° F., the equilibrated acid being essentially saturated with respect to the fluorine component of said rock at the temperature of the attack stage; the temperature and the time of reaction serving to dissolve at least about 90 percent of the tricalcium phosphate in the rock to produce a monocalcium phosphate-phosphoric acid-water solution up to about 90 percent saturated with monocalcium phosphate and containing insoluble material and a soluble fluorine content of from about 1 to 3 percent, the weight ratio of $P_2O_5$ in the acid to $P_2O_5$ in the rock feed being sufficient to dissolve tricalcium phosphate values in the rock and provide the desired solution and at least about 7:1, separating the insoluble material from the solution to produce a solution of monocalcium phosphate-phosphoric acid-water (said solution having a fluorine content of from 1 to 3 percent), reacting sulfuric acid with said solution to produce phosphoric acid and precipitate calcium sulfate, the sulfuric acid being added in an amount essentially stoichiometric with respect to the monocalcium phosphate in the solution, separating the calcium sulfate from the phosphoric acid solution, removing a portion of the phosphoric acid as product, and recycling the remaining phosphoric acid solution to the attack stage to provide said equilibrated acid and removing a portion of the phosphoric acid as product.

There is no disclosure in the Case patent of a process for removing aluminum from the product acid by forming an aluminum fluorophosphate. Furthermore, the phosphoric acid produced by the process of the present invention is not an equilibrated phosphoric acid (as defined in the Case Patent) because of the removal of the aluminum and fluorine in the precipitation of the fluoroaluminum phosphate. In one embodiment of U.S. Pat. No. 282,466 of Oré, now U.S. Pat. No. 4,377,560, this low aluminum and low fluorine content phosphoric acid product is used to dissolve the tricalcium phosphate in the matrix; thereby controlling the fluoride content of the crystallization (of calcium sulfate) step such that the fluoroaluminum phosphate does not form until after the gypsum separation. The Oreé application also involves controlling the fluoride content by other means, such as volatilization and addition of sodium or potassium compounds.

In the manufacture of synthetic cryolite, an aluminum fluorophosphate $AlF_2H_2PO_4$ is reported in the U.S. Pat. No. 3,671,189 to Betts. This composition is different from that produced in the present process, in that it is relatively higher in HF than in the $AlFHPO_4$ of the present invention. Also, the production of the Betts compound would not lower the aluminum content of phosphoric acid to as great an extent as does the production of $AlFHPO_4.2H_2O$ as disclosed hereinafter. The process steps involved in the manufacture of synthetic cryolite are quite different from the process for manufacture of the novel fluoroaluminum phosphate of the present invention.

M. S. White, *New Zealand Journal of Science,* Volume 19, pages 421–431 (1976) discloses chemical analyses of chemical compounds in superphosphates made from phosphates of Christmas and Nauru Islands and Queensland. One reported compound was termed "RPF" and assigned the formula: $(Fe,Al)HPO_4F.2H_2O$. X-ray powder diffraction patterns were reported (at page 425) for "RPF" and for "synthesized material, Al analogue only." A chemical analyses of this latter material is given at page 427 of the paper. In the White paper, at Table 13, page 429, thermal degradation data is shown and the compound $(Fe,Al)HPO_4F.2H_2O$ is reported to have the analysis:

1.82% Fe, 10.4% Al, 0.87% Ca, 14.9% P and 10.5% F.

As used herein, the term "Falphite" (sometimes spelled "Falfite") means a precipitate from impure phosphoric acid (as opposed to pure materials) having the composition $AlFHPO_4.2H_2O$ and also containing iron (due to iron in the phosphate rock or matrix, from which the phosphoric acid was made) and containing less than 0.2 wt.% Ca.

In the present invention, the compound termed "Falphite" typically contains less than about 0.1% Ca, and usually no detectable Ca. Furthermore, the $Fe_2O_3$ analysis of such Falphite is usually less than about 3% (e.g. 2.35%).

Fluoroaluminum phosphate of composition $FAl(HPO_4).2H_2O$ is reported in the July 1980 Russian Journal of Inorganic Chemistry 25(7) 1980; however, this compound is reported as being formed by a process involving adding aluminum sulphate solution to a mixture of phosphoric acid and ammonium fluoride. The reagents used were "pure" or "highly pure" grades. No work is reported in the Russian Journal article of a process whereby $FAlHPO_4.2H_2O$ or $F(Fe,Al)HPO_4.2H_2O$ is prepared from impure phosphoric acid (e.g., green or black acid or from a high alumina content phosphoric acid produced from unbeneficiated matrix)

J. W. Akitt, N. N. Greenwood, and G. D. Lester, "Nuclear Magnetic Resonance and Raman Studies of the Aluminum Complexes formed in Aqueous Solutions of Aluminum Salts Containing Phosphoric Acid and Fluoride Ions," J. Chemical Society (A), 1971, mention the existence in a liquid phase of the complex $AlF_2H_2PO_4$.

Herein percentages are by weight unless otherwise specified.

SUMMARY OF THE INVENTION

The invention relates to producing HF from a composition containing $FAlHPO_4.2H_2O$, which also contains iron and which contains less than 0.2 wt. % calcium. The compound can be prepared by saturating a fluoride-containing phosphoric acid (which also contains iron) with respect to aluminum, for example, by dissolving $Al_2O_3$ (e.g., as $Al(OH)_3$) in hot, aqueous wet process phosphoric acid of about 15%–45 wt % $P_2O_5$ analysis, which contains fluoride and iron as impurities. When the aluminum saturated phosphoric acid is cooled or aged, a solid precipitate forms of essentially calcium-free fluoroaluminum phosphate containing iron. The precipitate can be separated by filtration, settling, centrifuging etc. The resulting phosphoric acid liquid has a low content of aluminum and is low in fluorine.

One aspect of the invention is a process for producing HF and for removing aluminum and fluorine from impure aqueous phosphoric acid analyzing, in weight percent, no more than about 45% $P_2O_5$, in the range of about 2% to about 4% $Al_2O_3$ and about 1% to about 2% F, said process comprising: (a) aging the impure aqueous phosphoric acid at an elevated temperature for sufficient time to permit the formation of solid precipitate comprising a fluoroaluminum phosphate; (b) separating the solid precipitate from the aged phosphoric acid thereby removing aluminum and fluorine from the impure, aqueous phosphoric acid; (c) thermally decomposing the solid precipitate to evolve HF; and (d) recovering the evolved HF.

The process for manufacture of fluoroaluminum phosphate can be used in connection with any phosphoric acid process which produces a high aluminum content phosphoric acid or a high fluorine content phosphoric acid. The process can also be useful for removing fluorine and aluminum from dihydrate and hemihydrate black acids produced in Florida, or for removing fluorine from phosphoric acid produced by a "kiln" process, such as those of commonly owned, copending U.S. applications Ser. Nos. U.S. 265,305 and 265,307, now U.S. Pat. Nos. 4,351,809, and 4,351,813 respectively, both of which issued Sept. 28, 1982, and 265,306 now abandoned, and incorporated herein herein. Other methods of making such phosphoric acids are in U.S. Pat. Nos. 3,235,330 and 3,241,914.

The term "fluoroaluminum phosphate containing iron," as used herein, indicates a composition of the general formula $FAlHPO_4.2H_2O$ which also contains iron and in which the iron is not necessarily chemically balanced in the manner shown as $(Fe,Al)HPO_4F.2H_2O$.

The solid fluoroaluminum phosphate which contains iron is useful in the production of hydrofluoric acid and aluminum phosphate. The aluminum phosphate can be used as an intermediate in the production of soluble phosphates, fertilizers or animal feed supplements because it is readily defluorinated without forming a glass melt at high temperatures. It can also be converted to valuable sodium or potassium phosphates by reaction with sodium or potassium compounds (e.g. $Na_2CO_3$) as by addition to the calcine feed or by reaction with the aluminum phosphate product of the calcination.

The fluoroaluminum phosphate containing iron can be decomposed (as by heating at about 195° C. or higher) to produce HF and aluminum phosphate. Relatively pure phosphate salts, as of sodium, potassium, etc. can be made by reaction of the appropriate reagent with the aluminum phosphate or with the calcine feed mixture.

The fluoroaluminum phosphate can be produced by the aging of any aqueous phosphoric acid containing sufficient fluorine and aluminum and analyzing no more than about 45% $P_2O_5$, but preferably is produced from an acid analyzing at least 1% F and 2% $Al_2O_3$, typically in the range of about 15%–45 weight percent $P_2O_5$, 2–4% $Al_2O_3$ and 1–2% fluorine.

In one embodiment, the process involves digestion of phosphate ore matrix, in recycled phosphoric acid, filtration of the insoluble residue, precipitation and filtration of gypsum by addition of a sulfate (e.g., sulfuric acid), and aging of the product acid to precipitate the aluminum impurity as a fluoroaluminum phosphate compound. However, it has been discovered that in continuously producing phosphoric acid from unbeneficiated, high aluminum phosphate matrix, the steady-state phosphoric acid produced during the reaction of sulfate with dissolved monocalcium phosphate, can have such a high content of fluorine and/or aluminum as to cause premature coprecipitation of Falfite (e.g., an aluminum fluorophosphate containing iron) with the solid calcium sulfate. Such coprecipitation with calcium sulphate is undesirable, especially if the Falphite is to be converted into an aluminum phosphate.

In the invention of Oré (Ser. No. 282,466) such premature coprecipitation is hindered by the controlled removal of fluorine, preferably effected by adding a compound of sodium or potassium or both (e.g., sulfates, carbonates, hydroxides, nitrates, silicates, etc.) to the reaction mixture to which sulfuric acid or other sulfate is added. Less preferred is removal of fluorine by volatilization (as of $SiF_4$).

Another method for preventing premature coprecipitation of Falphite with the calcium sulfate is the invention of a co-worker Sung-Tsuen Liu and involves adjusting the dissolved fluorine and aluminum levels in the reaction vessel to maintain them within a stable liquid-phase region in the $P_2O_5$—$Al_2O_3$—F—$H_2O$ phase diagram and to avoid the region where $Al(HPO_4)F \cdot H_2O$ will precipitate. For example, above about 60° C. (e.g., in the temperature range of about 60° C. to about 80° C.) in phosphoric acid of about 30% $P_2O_5$ analysis and containing about 1% $SO_4^=$, excess HF is added (based on the $Al_2O_3$ analysis) to ensure no Falphite precipitation.

In general, for a given wet process phosphoric acid system the stable region and the amount of HF to add can be readily determined by experiment and, typically, will be at a mole ratio of soluble $Al_2O_3$/F bound to $Al_2O_3$ of below about 2.0.

The HF for use in such a process of preventing coprecipitation is preferably obtained by the thermal decomposition of Falphite (as described herein).

The invention can involve a process for removing aluminum and fluorine (and iron, if present) from impure aqueous phosphoric acid analyzing, in weight percent, no more than about 45% $P_2O_5$, in the range of about 2 to about 4% $Al_2O_3$ and about 1 to about 2% F, said process comprising:
  (a) aging said impure aqueous phosphoric acid at an elevated temperature for sufficient time to permit the formation of a solid precipitate comprising a fluoroaluminum phosphate; and,
  (b) separating said solid precipitate from the aged phosphoric acid.

The impure aqueous phosphoric acid can be obtained by (i) dissolution of a high alumina-content phosphate rock in aqueous phosphoric acid to produce a solution comprising monocalcium phosphate (and dissolved iron, aluminum and fluorine) and (ii) adding sulfate ions to said solution comprising monocalcium phosphate to produce said impure aqueous phosphoric acid. The high alumina content phosphate rock can comprise unbeneficiated phosphate ore matrix, high alumina pebble or any high alumina content phosphate rocks, such as those in U.S. Pat. No. 4,284,614.

One embodiment of the present invention involves a direct route to phosphoric acid from phosphate matrix, sometimes hereinafter called "the matrix process." This process is the invention of Fernando Oré and is not per se claimed herein.

The matrix process of Oré consists of three steps:
  1. Dissolution of phosphate values, and separation of insoluble solids. Preferably a flocculant, e.g., a poly acrylamide is added to aid the separation.
  2. Precipitation and separation of calcium sulfate; and
  3. Separation of soluble metallic impurities, especially aluminum, to produce commercial quality acid (as by extraction or precipitaion, as in U.S. Pat. Nos. 4,243,637; 4,082,836 and 4,243,643).

The matrix process permits processing of lower grade ore which cannot economically be processed by present technology. This is of particular interest due to the declining quality of phosphate reserves world-wide.

The present invention for making HF can use a Falphite precipitate obtained from a so-called "matrix process" for producing phosphoric acid from unbeneficiated phosphate ore matrix, together with additional steps to form and separate Falphite. This process comprises:
  (a) digesting said phosphate ore matrix in aqueous impure phosphoric acid containing as impurities dissolved ions of aluminum and fluorine, to produce undissolved solids and a solution comprising ions of calcium, phosphate, fluorine and aluminum;
  (b) separating said undissolved solids from said solution comprising ions of calcium, phosphate, fluorine and aluminum;
  (c) adding sufficient sulfuric acid to said solution comprising ions of calcium, phosphate, fluorine and aluminum to cause the precipitation of substantially all of said ions of calcium as solid gypsum and producing an impure aqueous phosphoric acid solution containing ions of aluminum and fluorine,
  (d) separating said solid gypsum from said impure aqueous phosphoric acid containing ions of aluminum and fluorine, to produce a low solids content impure aqueous phosphoric acid;
  (e) aging said low solids content impure aqueous phosphoric acid to cause formation of a solid precipitate comprising an aluminum fluorophosphate (which typically will also contain iron) in an aqueous solution comprising phosphoric acid and;
  (f) separating said solid precipitate from said aqueous solution comprising phosphoric acid to obtain a phosphoric acid product.

Production of good quality gypsum can be achieved at short residence time (about 15 minutes) for high alumina matrix acid at about 75° C., and about 3% sulfate level.

In the matrix process a portion of the low solids content impure aqueous phosphoric acid can be used in the digestion of step (a).

In the processes described herein, recovery of phosphate values from the matrix into the product acid can be greater than 80%. Conventional processes only recover approximately 50% of the phosphate in the matrix, the major loss of 40% being suffered during the rock beneficiation process.

THE DRAWING

The accompanying

Sulfuric acid is added to the monocalcium phosphate to precipitate calcium sulfate (e.g., gypsum) and to produce phosphoric acid. The solid calcium sulfate is separated (as by filtration) to produce phosphoric acid. Part of the phosphoric acid (typically, the strong wash stage of the filtration) is recycled to the dissolver to digest more matrix while the remainder is preferably passed to the post precipitation stage, where it is aged to form a solid essentially calcium-free fluoroaluminum phosphate containing iron, which solid is separated by filtration.

FURTHER DESCRIPTION

Most current commercial processes for the production of wet process phosphoric acid involve reacting beneficiated phosphate rock (essentially the calcium phosphate mineral apatite) with sulfuric acid to produce the crude acid and calcium sulfate (either dihydrate or hemihydrate). However, during the flotation beneficiation of the rock, as much as 30–40% of the phosphate values are discarded, and a fine solids slurry, called slimes, is produced. These slimes require impoundment for several years to allow settling and dewatering of the fine solids, which creates a considerable environmental problem. In addition, there has been a steady decline in the quality of phosphate rock produced, as the producers follow the standard procedure of mining the highest quality rock available.

For these reasons, it is desirable to have a matrix process to utilize raw, unbeneficiated phosphate matrix directly as feed for wet process phosphoric acid production.

Matrix process phosphoric acid can contain undesirably high amounts of aluminum. Fluoroaluminum phosphate (AFP or Falphite) precipitation from hot phosphoric acid (e.g., pH about 28% $P_2O_5$) can be used for aluminum removal in a matrix process. The precipitation behaves as a classical system with first order kinetics.

Falphite has shown the potential of being an excellent source of high purity HF and sodium phosphates, thus offering the possibility of by-products recovery revenue from a waste material.

Aluminum can be precipitated from hot phosphoric acid solutions (e.g., 28% $P_2O_5$) as a salt identified as a fluoroaluminum phosphate hydrate having the following composition (which can be expressed as $AlFHPO_4 2H_2O$):

$P_2O_5 = 40-42\%$
$Al_2O_3 = 30-32\%$
$F = 10-11\%$
$H_2O = 18-20\%$

The product phosphoric acid, after the aluminum precipitation at the right conditions, could be made to contain as low as 1% $Al_2O_3$. The major operation involved is to age the high aluminum acid for around 3 hours at 80°–90° C. Usually, essentially no calcium is found in the precipitate. Some iron is also coprecipitated in the aluminum precipitation, but only as a minor constituent (e.g., less than about 3.0% $Fe_2O_3$ by analysis, typically about 1.3% to about 2.4%).

Figure 1:
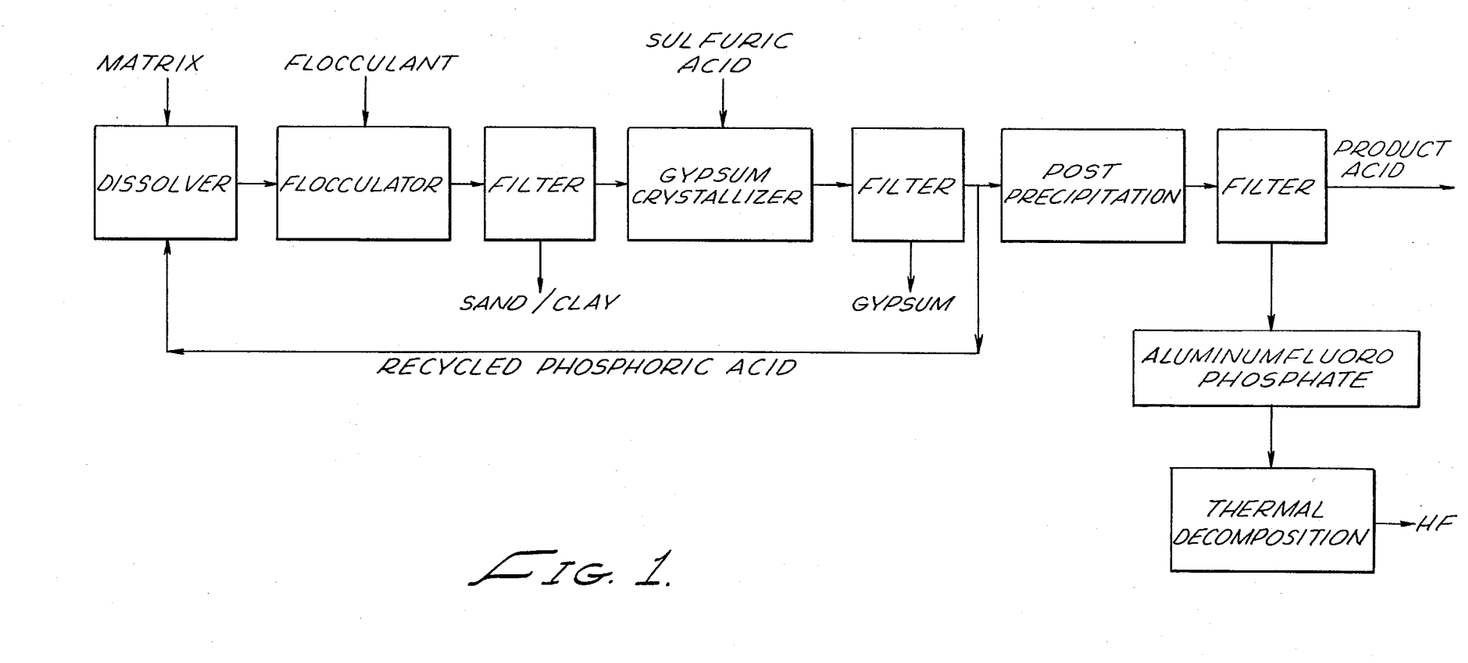
FIG. 1 illustrates a preferred embodiment of the invention wherein unbeneficiated phosphate matrix is digested with recycled phosphoric acid (leaving a residue of undissolved solids). A flocculant (e.g., a polyacrylamide) is added to aid the separation of the solids. The solids (comprising sand and clay) are separated to produce a solution comprising monocalcium phosphate and impurities.

The block diagram of FIG. 1 illustrates one matrix phosphoric acid process which includes the present HF process. The recycled phosphoric acid digests the matrix in the dissolver. Flocculant addition facilitates the separation of undigested solids, such as sand and clay, from the liquid acid through a filtration stage.

Some polyacrylamide flocculants for the separation of dissolution residue can be effective in dosage levels of around 100 ppm by weight of reaction mixture. Around 1,000 ppm is usual for other flocculants. The preferred flocculants include slightly ionic polyacrylamides, such as Sanflor AH-70P, produced by Sanyo Industries of Japan.

Sulfuric acid is added to the crystallizer for gypsum formation. Product acid becomes readily available after the gypsum filtration. However, when a high level of aluminum exists in the matrix, the product acid can exceed acceptable commercial specifications for aluminum content.

Accordingly, the process of FIG. 1 incorporates a postprecipitation stage and a filtration stage for formation and separation of fluoroaluminum phosphate from the product acid. This lowers the aluminum and fluorine contents of the product phosphoric acid.

If the phosphate matrix is relatively low in aluminum phosphates, the digestion is preferably done at a low temperature to reduce solubilization of aluminum compounds in the rock. This is the invention of Eli Chemtob and is not claimed per se herein.

Characterization of Matrix Feed Composition

Samples of matrix from north Florida were received and analyzed to illustrate the matrix quality and ranges of impurities that would be encountered in a commercial process.

Analyses of numerous matrix samples is reported in Table 1 to illustrate ranges of various compositional variables such as suspended solids, moisture content and the limits of the major impurities aluminum, iron, magnesium and fluoride.

"Suspended solids" are a measurement of fine particles which are easily suspended in aqueous media (e.g., those particles which produce slimes). "Suspended solids" are calculated by dividing the initial dry weight of a sample of matrix by the net loss of weight after five washes with water at ambient temperature. For each wash, the water/initial matrix weight ratio was 3 (typically 30 gms of dry matrix and 90 gms of water). The resulting slurry was then allowed to settle for 60 seconds (after 60 seconds of stirring) and the supernatant liquid, including any suspended solids were decanted.

Weight percent suspended solids is used as an indication of matrix type (clay or sandy). Laboratory work has shown that clay-type matrix requires more flocculant than the sandy type during the clay/sand removal step in the matrix process.

Determination of leachable $Al_2O_3$ and $Fe_2O_3$ contents were made using reagent grade phosphoric acid containing 28% $P_2O_5$ and 1% F.

In core samples of matrix, leachable $Al_2O_3$ can range from about 23% to about 95% of the total $Al_2O_3$ content, with an average value of about 69%. Leachable $Fe_2O_3$ ranges from about 24% to about 87% of the total, with an average value of about 65%.

TABLE 1

| COMPOSITIONS OF VARIOUS MATRIX SAMPLES (WT. %) | | | | | | | | | |
|---|---|---|---|---|---|---|---|---|---|
| | MATRIX | MATRIX | #146 | #148 | #151 | #147 | #149 | #150 | BENEFICIATED ROCK |
| $P_2O_5$ | 13.8 | 9.9 | 11.9 | 12.1 | 11.6 | 15.6 | 17.8 | 14.6 | 32.7 |
| Suspended Solid | — | — | 22 | 15 | 14 | 80 | 62 | 82 | — |
| Moisture Content Ratios × 100 | (Dry) | (Dry) | 15 | 14 | 16 | 18 | 16 | 19 | (Dry) |
| $Al_2O_3:P_2O_5$ | 10.3 | 24.2 | 25.2 | 25.6 | 25.9 | 27.6 | 24.2 | 26.7 | 4.4 |
| $MgO:P_2O_5$ | 4.1 | 0.4 | 2.4 | 2.2 | 2.2 | 4.0 | 3.3 | 4.7 | 1.0 |

TABLE 1-continued

| | COMPOSITIONS OF VARIOUS MATRIX SAMPLES (WT. %) | | | | | | | BENEFICIATED |
|---|---|---|---|---|---|---|---|---|
| | MATRIX | MATRIX | #146 | #148 | #151 | #147 | #149 | #150 | ROCK |
| $Fe_2O_3:P_2O_5$ | 8.7 | 1.8 | 7.4 | 7.1 | 7.7 | 11.3 | 11.7 | 16.0 | 1.9 |
| $CaO:P_2O_5$ | 1.43 | 1.42 | 1.61 | 1.50 | 1.59 | 1.51 | 1.54 | 1.55 | 1.51 |
| $F:P_2O_5$ | 9.4 | 4.1 | 15.3 | 10.9 | 13.5 | 15.8 | 13.1 | 15.8 | 11.8 |

CONDITIONS OF FORMATION OF $FAlHPO_4.2H_2O$ (sometimes hereinafter "Falphite")

| A. Components in solution | Minimum | Maximum |
|---|---|---|
| $P_2O_5$ | 5% | 50% |
| $Al_2O_3$ | 2% | *saturated |
| F | 1% | no maximum |

*The saturation in phosphoric acid solution with respect to $Al_2O_3$ varies with the concentration of $P_2O_5$ and F and also with temperature. The phase diagram of the system $P_2O_5-Al_2O_3-HFH_2O$ is not yet fully established. The saturation of aqueous $P_2O_5$ with respect to $Al_2O_3$ in the presence of HF at 80° C. is around 4% (with 28% $P_2O_5$).

B. Temperature and Residence Time With the components conditions cited above, Falphite starts to form after a residence time of 2–3 hours at ambient temperatures or above, preferably above about 60° C., and the precipitation is complete in about 1–2 hours after nucleation. Nucleation can be induced by seeding. The nucleation time decreases with temp., as well as the total precipitation time, and passes by a maximum at 80° C.

If the solution is seeded with Falphite from a previous run, the nucleation time is greatly reduced (e.g. about ½ hour).

The nucleation time is also inversely proportional to the concentration of $P_2O_5$ in the acid and the quantity of Falphite formed is also greater at low $P_2O_5$ concentrations, when all other variables are constant.

At low temperatures, Falphite is formed much more slowly, even with seeding. As an example a solution containing 28% $P_2O_5$, 4% $Al_2O_3$ and 2% F. behaves as follows:

| Aging Temperature (°C.) | Start of Falphite Formation |
|---|---|
| 25 | 5 days |
| 40 | 30 hours |
| 55 | 6 hours |

The aluminum content can be reduced in a solution of phosphoric acid containing from about 5 to about 45% $P_2O_5$ and about 1 to about 4% $Al_2O_3$ and about 1 to about 2% F. (as HF or free fluoride ion) by aging this solution for a period from about 1 hour to about 7 days at temperatures between 25° C. and the boiling temperature of the solution. The precipitate, when dried at 100° C. has the following formula $AlPO_4.HF.2H_2O$ or $(AlF)^{++}(HPO_4)^=.2H_2O$. This composition is substantially constant and substantially independent of the temperature, residence time, and the initial concentration of $P_2O_5$, Al and F.

When the phosphoric acid solution contains other elements or radicals such as $SO_4$, $Fe_2O_3$, CaO, MgO, the Falphite precipitate is substantially free from all these impurities except $Fe_2O_3$. Typically, no detectable calcium or sulphate is found and less than about 0.3% MgO. The quantity of $Fe_2O_3$ in the precipitate is almost constant, about 1.5 to 2% (e.g., 2.35%) over a wide range of quantity of iron in the original phosphoric acid solution (e.g. about 0.7 to 1.4%). The formation of this precipitate provides an easy method to deplete the aluminum from a high aluminum content wet process phosphoric acid and also to deplete the fluorine from a high fluorine wet phosphoric acid solution.

Falphite solubility increases as the sulfate content increases. A falphite precipitation study of solutions containing 0.5 to 1.5% CaO and no sulfate indicates that solids or gels with unknown composition are formed immediately from a phosphoric acid solution with a F/Al mole ratio near 2 or higher. These gels are very stable at room temperature. However, some of the gels convert to crystalline solids after aging overnight at 80° C. The degree of conversion to crystalline form decreases with increasing F/Al mole ratio. This gel formation can occur in excess calcium phosphoric acid solution with very low $Al_2O_3$ content (30% $P_2O_5$, 0.3% $Al_2O_3$, 0.5% CaO, 1% F).

TABLE 2

PHOSPHORIC ACID AT VARIOUS $P_2O_5$ CONCENTRATIONS CONTAINING 3.8% $Al_2O_3$ and 2% F
In all the experiments, 32 g of acid was heated to 80° C. and 0.05 g of Falphite from a previous experiment were added as a seeding as soon as the temperature reached 80° C. and the mixture was stirred at this temp. for 6 hours.

| wt % $P_2O_5$ in Starting Acid | Analysis of Filtrate (wt %) | | | Analysis of Precipitate (g/100 g original acid) | | | |
|---|---|---|---|---|---|---|---|
| | $P_2O_5$ | $Al_2O_5$ | F | Weight | $P_2O_3$ | $Al_2O_3$ | F |
| 55 | Not Done | | | No Precipitate | | | |
| 50 | Not Done | | | Very Faint Preciptitate (Negligible) | | | |
| 45 | 42.9 | 2.80 | 1.68 | 3.6 | 41.1 | 30.3 | 9.48 |
| 40 | 39.0 | 1.88 | 1.24 | 7.7 | 40.5 | 29.6 | 9.30 |
| 35 | 31.9 | 1.22 | 1.00 | 10.0 | 38.1 | 27.2 | 9.17 |
| 30* | 26.8 | 1.08 | 1.18 | 9.5 | 38.5 | 27.8 | 9.16 |
| 27** | 23.55 | 0.65 | 0.23 | 11.5 | 39.3 | 28.6 | 9.48 |
| 25 | 20.5 | 0.65 | 1.00 | 10.85 | 38.4 | 27.2 | 9.04 |
| 20 | 16.2 | 0.60 | 0.84 | 11.9 | 36.5 | 27.1 | 8.88 |

*This experiment's residence time was only 3 hours.
**This experiment was done at an earlier time, first with 30 g of acid, then with the addition of 15 gm of acid containing 3.8% $Al_2O_3$ but no fluorine. Therefore actual total F was 1.33%

Removal of Aluminum From Wet Process Phosphoric Acid

When unbeneficiated phosphate matrix is used to produce phosphoric acid, the content of aluminum can be so high as to make the product acid unacceptable for most commercial uses. That is, gelatinous or sludge-like precipitates can form when wet process phosphoric acid of high aluminum content is aged, as during storage or transport. Such precipitates are costly to separate from the phosphoric acid or to remove from the bottom of a storage tank or transport vessel.

The amount of aluminum which can be removed by the present process is usually such as to produce a phosphoric acid analyzing about 1% Al. Such a phosphoric acid can be further treated to produce a lower Al content phosphoric acid, if such is desired. Processes which can be used to further reduce the aluminum content of phosphoric acid include extraction of impurities from the acid (e.g. see U.S. Pat. No. 4,284,614), extractions of substantially purer $P_2O_5$ values from the impure acid (e.g. see U.S. Pat. Nos. 3,397,955; 3,410,656); precipitation of compounds containing aluminum and magnesium from the acid by adding fluorine (e.g. see U.S. Pat. Nos. 3,642,439, 4,136,199 and 4,299,804), and other precipitations (e.g., see U.S. Pat. Nos. 3,442,609, 3,379,501 and British Pat. No. 467,843 of June 24, 1937).

The apparatus and processes in U.S. patent application Serial No. 358,744 filed Mar. 16, 1982 of Hollifield and Smith (which is incorporated herein) can be useful in separating Falphite and other precipitates from phosphoric acid, especially precipitates formed on aging phosphoric acid to which has been added the calcium and fluorine-containing sludge obtained by adding lime and/or limestone to pond water from wet process phosphoric acid processes (e.g., see U.S. Pat. Nos. 4,233,281 and 4,243,643).

Aluminum in wet phosphoric acid can be removed by precipitation of an aluminum-magnesium-fluoride complex called "ralstonite". This compound has been chiefly used for the precipitation of magnesium in a high magnesium content acid (e.g., see U.S. Pat. No. 4,243,643) and this precipitation is currently performed in practice successfully when the ratio of magnesium to aluminum in the acid is sufficiently high to separate magnesium while leaving a substantial amount of aluminum in the liquid phase. When aluminum is the desired element to be removed from a high aluminum acid, the ratio of magnesium to aluminum is usually so small that the precipitated aluminum would be insignificant compared to the bulk of existing aluminum. However, as noted above, such a precipitation can be useful in further treating acid which has been previously treated by the process of the present invention.

The present invention provides an improved method of removing aluminum from a high aluminum phosphoric acid. For example, the aluminum can be brought down from about 4% to around 1% in the acid after precipitation. The precipitated $P_2O_5$ values in the Falphite need not be lost because they can be later recovered, as can the fluorine and aluminum values.

ILLUSTRATIVE EXAMPLES

Example 1

A continuous laboratory matrix dissolution unit, using the process techniques described herein, was operated at about 60° to 70° C. for 63 hours (on an 8-hour per day, 5-day week basis). It was put on standby over night and weekends. While on standby, the acid temperature was held at about 60°-70° C. The dissolution reactor operated satisfactorily at approximately +1.2% free sulfate ion concentration in the solution. At these conditions both matrix dissolution and gypsum crystallization occurred simultaneously. This shows that the process can operate using a single reactor system for dissolution and crystallization.

The average filtration rate of the undigested matrix solids and gypsum during the run was calculated to be 0.24 TPD $P_2O_5$ per square foot of filter area without the use of flocculants. This should improve with flocculants and/or heated wash liquors.

As the run progressed, the aluminum level in the recycled phosphoric acid increased linearly, with respect to time, from 0.6% to 2.3% $Al_2O_3$. At this point, overnight storage of the phosphoric acid at about 80° C. produced a substantial amount of fluoroaluminum phosphate precipitate, lowering the aluminum in the acid to 1.4% (39% reduction).

The iron level of the acid during the run increased from 0.9% to 1.3% $Fe_2O_3/P_2O_5$ ratio. The sandy-type matrix used as feed had a relatively low $Fe_2O_3/P_2O_5$ ratio.

A study was made of the effect of $P_2O_5$ concentration on the aluminum precipitation (fixed aluminum and fluorine levels) in the usual range of $P_2O_5$ concentration expected for phosphoric acid produced by the matrix process as described herein. The experiments were at 80° C. and six hours aging (after seeding with preformed precipitate). The results are summarized as follows:

1. The precipitate has a constant composition independent of $P_2O_5$ concentration corresponding to the stoichiometry $AlFHPO_4 \cdot 2H_2O$;
2. The precipitate forms best at lower $P_2O_5$ concentrations. It does not form at all above about 45% $P_2O_5$;
3. The best conditions appear to be about 25% $P_2O_5$, about 2-4% $Al_2O_3$ and about 1-2% F, which are easily reached in the matrix process by control of the digestion rate and recycle of impure acid from the gypsum filter.

EXAMPLE 2

The discovery of the compound $FAlHPO_4 \cdot 2H_2O$ was an unexpected result of experiments, the purpose of which were to find how much aluminum that a wet dihydrate process "black" phosphoric acid (produced by the Occidental Chemical Company in north Florida) could tolerate. $Al_2O_3$ has its maximum solubility at 80° C. The Florida dihydrate acid was chosen because it is similar to the acid produced by the matrix process of Example 1, particularly with regards to the $P_2O_5$ concentration. The analysis of this acid in weight % follows:

$P_2O_5 = 26.75$
$F = 2.00$
$SO_4 = 1.47$
$SiO_2 = 0.11$
$Fe_2O_3 = 0.86$
$Al_2O_3 = 3.47$
$CaO = 0.15$
$Mg = 0.25$

The acid was heated at 80° C. (this is a typical temperature of the product matrix acid, as from Example 1) and small quantities of $Al_2O_3$, in the form of pure aluminum hydroxide, $Al(OH)_3$, were added slowly and stirred until completely dissolved. After a while (and many additions of $Al(OH)_3$) the solution did not become completely clear after the last addition, even after 15 minutes. The solution was left for a longer residence time in an attempt to clarify the solution. After 3 hours residence time at 80° C., a massive precipitate appeared suddenly. The precipitate kept increasing in quantity, making the slurry so viscous that the stirrers stopped rotating. The slurry was filtered and the filtered acid analyzed. The residue on the filter was not washed but analyzed "as is."

The analysis of the filtrate was:
$P_2O_5 = 26.1$
$Fe_2O_3 = 0.87$
$Al_2O_3 = 1.65$
$F = 1.35$
$CaO = 0.11$
$MgO = 0.25$ $SiO_2 = 0.27$ An extrapolated analysis of the solid residue (by subtracting the amount of each element due to entrainment of filtrate, calculated from the relative proportion of calcium in the filtrate) gave the following analysis of the solid.

$P_2O_5 = 41.05$
$Fe_2O_3 = 1.27$
$Al_2O_3 = 24.75$
$F = 9.85$

A surprising discovery came when the values for aluminum in the aluminum doped acid were compared with the filtered acid separated from the precipitate. The filtered acid had 1.6% aluminum oxide, a reduction from the 3.7% in the acid before precipitation.

EXAMPLE 3

Production of HF By Heat Decomposition of Falphite

Falphite also has the important property of decomposing at temperatures from about 160° C. to about 500° C. to evolve HF and $H_2O$, leaving a residue of aluminum phosphate (which may contain some iron from the wet process phosphoric acid). This is a process for producing HF from phosphate-containing ores. The aluminum and phosphate value of the calcined residue can also be recovered. Therefore, Falphite formation can be used to separate the aluminum in a phosphoric acid solution and to produce HF by thermal decomposition of the Falphite.

When the fluoroaluminum phosphate $FAlHPO_4 \cdot 2H_2O$ (prepared as in Example 2) is heated the following reactions take place:

1. From room temperature to about 160° C. water only is evolved.
2. From 160° C. to about 500° C. HF is evolved, first very rapidly between about 180° C. to about 220° C. and then very slowly to about 500° C. where substantially all the fluorine is expelled. The residue at this temperature has still the same physical shape at the original fluoroaluminum phosphate i.e. no observable melting or clinker formation. The HF-free residue is found upon analyses to be aluminum orthophosphate, $AlPO_4$.

This provides a process for producing HF from impure phosphoric acid (with or without $H_2O$ according to the temperature chosen). The HF can be swept out with air, or an inert gas, and collected.

It is best to operate the decomposition under conditions where the water of hydration is removed separately from the HF, thus simplifying the recovery of HF in anhydrous form.

The decomposition can also be done under reduced pressure.

HEAT DECOMPOSITION OF FALPHITE

The attached Table 3 gives the loss on ignition as well as the quantity of fluorine remaining in a sample of Falphite at each stage of heating.

TABLE 3

| | | F | | |
|---|---|---|---|---|
| T °C. | Loss on Heating | % in heated product (as is) | % in heated product (reported to 100 g of original) | Ratio of % F in sample to % F in original |
| 70 | original | | | |
| 100 | 10.2 | — | — | — |
| 120 | 15.4 | 10.2 | 8.9 | 100 |
| 140 | 16.8 | — | — | — |
| 160 | 21.2 | 11.3 | 8.9 | 100 |
| 180 | 26.3 | 10.2 | 7.52 | 84 |
| 200 | 35.1 | 2.06 | 1.34 | 15 |
| 220 | 36.3 | 1.34 | 0.85 | 9.5 |
| 240 | 36.6 | 0.85 | 0.54 | 6.1 |
| 260 | 36.9 | 0.79 | 0.50 | 5.6 |
| 340 | 37.0 | 0.29 | 0.18 | 2.1 |
| 410 | 37.1 | 0.15 | 0.094 | 1.1 |
| 480 | 37.1 | 0.05 | 0.031 | 0.35 |

What is claimed is:

1. A process for producing HF and for removing aluminum and fluorine from impure aqueous phosohoric acid analyzing, in weight percent, no more than about 45% $P_2O_5$, in the range of about 2% to about 4% $Al_2O_3$ and about 1% to about 2% F., said processing comprising:
   (a) aging said impure aqueous phosphoric acid at an elevated temperature for sufficient time to permit the formation of solid precipitation comprising a fluoroaluminum phosphate which is a hydrate of $AlFHPO_4$, said elevated temperature being between 25° C. and the boiling temperature of said impure aqueous phosphoric acid;
   (b) separating said solid precipitate from the aged phosphoric acid, thereby removing aluminun and fluorine from the impure, aqueous phosphoric acid;
   (c) thermally decomposing said separated solid precipitate without treating with other reactants to evolve HF; and
   (d) recovering said evolved HF.

2. A process according to claim 1 wherein said impure aqueous phosphoric acid is obtained by (i) dissolution of a high aluninum-content phosphate rock in aqueous phosphoric acid to produce a solution comprising monocalcium phosphate and (ii) adding sulfate ions to said solution comprising monocalcium phosphate to precipitate calcium sulphate and produce said impure aqueous phosphoric acid.

3. The process of claim 2 wherein said high aluminum content phosphate rock comprises unbeneficiated phosphate ore matrix.

4. A process for producing hydrofluoric acid and phosphoric acid from unbeneficiated phosphate ore matrix containing clay, fluorides, silica and calcium phosphate, said process comprising:
   (a) digesting said phosphate ore matrix in aqueous impure phosphate acid containing as impurities dissolved ions of aluminum and fluorine, to produce undissolved solids and a solution comprising ions of calcium, phosphate, fluorine and aluminum;
   (a) separating said undissolved solids from said solution comprising ions of calcium, phosphate, fluorine and aluminum;
   (c) adding sufficient sulfuric acid to said solution comprising ions of calcium, phosphate, fluorine and aluminum to cause the precipitation of substantially all of said ions of calcium as solid gypsum and producing a second impure aqueous phosphoric acid solution containing ions of aluminum and fluorine;

(d) separating said solid gypsum from said second impure aqueous phosphoric acid containing ions of aluminum and fluorine, to produce a separated second impure aqueous phosphoric acid;

(e) aging said separated second impure aqueous phosphoric acid at a temperature operable to cause formation of a solid precipitate comprising a fluoroaluminum phosphate in an aqueous solution comprising phosphoric acid, such fluoroaluminum phosphate being a hydrate of AlFHPO$_4$;

(f) separating said solid precipitate from said aqueous solution comprising phosphoric acid to obtain a phosphoric acid product;

(g) thermally decomposing said solid precipitate without treating with other reactants to evolve HF; and (h) recovering said evolved HF.

5. The process of claim 4 wherein a portion of said phosphoric acid product is used in the digestion of step (a).

6. A process for producing HF and for removing aluminum and fluorine from impure aqueous phosphoric acid analyzing, in weight percent, in the range of about 15% to 45% P$_2$O$_5$, about 2% to about 4% Al$_2$O$_3$ and about 1% to about 2% F, said process comprising:

(a) aging said impure aqueous phosphoric acid at an elevated temperature in the range of about 50° to about 90° C. for sufficient time to permit the formation of solid precipitate consisting essentially of fluoroaluminum phosphate which is a hydrate at AlFHPO$_4$;

(b) separating said solid precipitate from the aged phosphoric acid thereby removing aluminum and fluorine from the impure, aqueous phosphoric acid;

(c) thermally decomposing said separated solid precipitate without treating with other reactants at a temperature in the range of about 160° C. to about 500° C. to evolve HF; and (d) recovering said evolved HF.

* * * * *

UNITED STATES PATENT AND TRADEMARK OFFICE
CERTIFICATE OF CORRECTION

PATENT NO. : 4,505,884                                   Page 1 of 2

DATED      : March 19, 1985

INVENTOR(S): Elie M. Chemtob

It is certified that error appears in the above-identified patent and that said Letters Patent is hereby corrected as shown below:

Column 2, lines 41 and 42, change "U.S. Pat. No. 282,466" to --S.N. 282,466--; Column 2, line 48, change "Oree'" to --Ore'--; Column 2, line 65, begin new paragraph with "M.S. White"; Column 3, line 5, change "analyses" to --analysis--; Column 3, line 34, after "matrix)" add --.--; Column 3, lines 59 and 60, after "centrifuging" add --.--; Column 4, line 19, after "incorporated" delete --herein--; Column 5, line 19, change "$SO_4^=$" to --$SO_4^=$--; Column 6, line 2, change "world-wide" to --worldwide--;Column 7, line 37, change "$PO_42H_2O$" to --$PO_4 \cdot 2H_2O$--; Column 8, line 22, change "Eli" to --Elie--; Column 8, line 30, change "is" to --are--; Column 8, line 45, after "solids" add --,--
Column 9, line 24, begin a new paragraph with the words "With the"; Column 9, line 26, delete the space before the word "form"; Column 9, line 28, delete the space

UNITED STATES PATENT AND TRADEMARK OFFICE
CERTIFICATE OF CORRECTION

PATENT NO. : 4,505,884             Page 2 of 2

DATED : March 19, 1985

INVENTOR(S) : Elie M. Chemtob

It is certified that error appears in the above-identified patent and that said Letters Patent is hereby corrected as shown below:

before the word "and"; Column 9, lines 31 and 32, the number "80°" (in line 31) and the "C." (in the middle of line 32) should read --80°C--; Column 9, line 43, after "F" delete the --.--; Column 9, line 56, after "F" delete the --.--; Column 10, line 40, change "$P_2O_3$" to --$P_2O_5$--; Column 13, line 40, change "at" to --as--; Column 13, line 41, add a comma before and a comma after "i.e."; Column 13, line 43, change "analyses" to --analysis--; Column 14, line 25, change "processing" to --process--; Column 14, line 61; change "(a)" to --(b)--; Column 16, line 10, change "50®" to --50°--.

Signed and Sealed this

Twenty-second Day of October 1985

[SEAL]

Attest:

DONALD J. QUIGG

Attesting Officer        *Commissioner of Patents and Trademarks—Designate*